(No Model.)

G. A. GREENE.
TREADLE POWER.

No. 294,224. Patented Feb. 26, 1884.

WITNESSES:
Dom Twitchell
C. Sedgwick

INVENTOR:
G. A. Greene
BY Munn & Co.
ATTORNEYS.

UNITED STATES PATENT OFFICE.

GEORGE A. GREENE, OF TAYLOR, TEXAS.

TREADLE-POWER.

SPECIFICATION forming part of Letters Patent No. 294,224, dated February 26, 1884.

Application filed July 11, 1883. (No model.)

*To all whom it may concern:*

Be it known that I, GEORGE A. GREENE, of Taylor, Williamson county, Texas, have invented a new and Improved Treadle-Power, of which the following is a full, clear, and exact description.

My invention consists of a pair of treadles contrived in such arrangement that the operator may stand erect and operate the machine by a natural walking motion, together with contrivances whereby the operator may at the same time apply the power of the hands and arms to assist the legs when greater power is required, and for the relief of the legs when less power is required. By enabling the operator to stand erect and to apply the weight of his body to the treadles by a natural walking motion, or substantially so, he can apply greater power and continue a longer time with less fatigue than in any other way; and by utilizing the power of the arms, in addition thereto, still better results may be obtained, all as hereinafter fully described.

Reference is to be had to the accompanying drawings, forming part of this specification, in which similar letters of reference indicate corresponding parts in all the figures.

Figure 1:
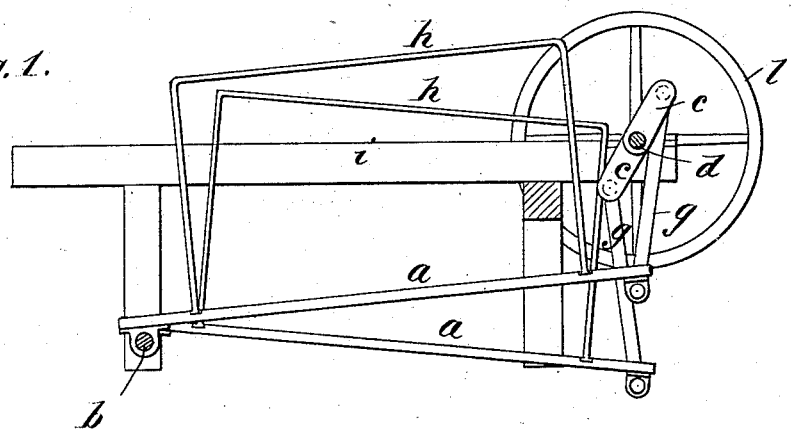
Figure 2:
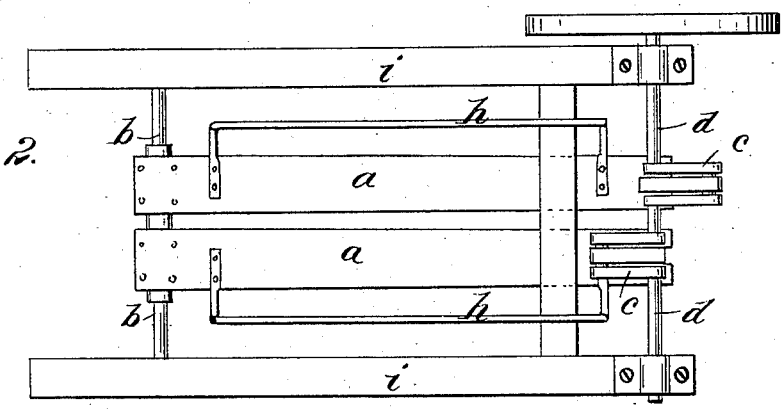
Figure 3:
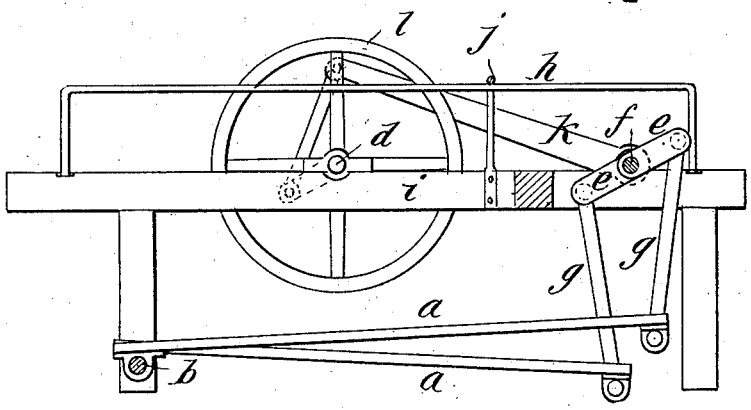

Figure 1 is a longitudinal sectional elevation of my improved treadle-power apparatus in one form of arrangement which I propose. Fig. 2 is a plan view of the machine as represented in Fig. 1, and Fig. 3 is a longitudinal sectional elevation in a modified form.

I arrange a pair of treadles, $a$, on pivots $b$, and in connection with the cranks $c$ on the revolving shaft $d$ or the arms $e$ of a rock-shaft, $f$, in any approved way, either as represented in the drawings, whereon the operator stands between the pivots and connecting-rods $g$, or in any other equivalent way, as by pivoting the treadles in the middle and arranging them for the operator to stand on the ends opposite to those connected to the driving-shaft, or otherwise, said treadles being so that the operator may rest his whole weight on the descending treadle to apply the power of the same, changing from one to the other when the treadles reverse, as in walking, which is a natural exercise, of which the body is capable of enduring as much or more than of any other kind. Together with the treadles thus arranged, I propose to employ hand-rails $h$, attached to the treadles, as in Figs. 1 and 2, or to the frame $i$, as in Fig. 3, whereby the operator may exert the powers of his arms to pull in the opposite direction of the thrusts of his feet, the effect of which is to add the power of his arms to the weight of the body, the pull being on the rising treadle when the rails $h$ are attached to the treadles; but when they are attached to the frame the effect is the same whichever rail is used. Said rails will also serve to rest the body by dividing the labor, and also by serving as a rest by bearing on them with the hands when it is not required to utilize the power of the hands.

Besides the side rails, $h$, a cross-rail, $j$, may be used, to enable the operator to change the position of the arms and hands when required.

When the rock-shaft $f$ is employed, the power may be transmitted by a vibrating arm, $k$, to the crank-shaft $d$ and fly-wheel $l$.

This improved power may be used for driving any kind of light machinery—as churns, lathes, saws, velocipedes, rail-cars, and the like.

The use of the hand-rails, when attached to the treadles, is that the hands may assist the feet in throwing the weight of the body from one treadle to the other, and the thrust of one hand may be in the same direction as that of one foot, while the other hand may pull in the opposite direction. When the right-hand treadle is at the highest point, then the right hand assists the right foot in raising or throwing the weight of the body on the treadle, thus relieving the leg of part of the work of lifting the body, while at the same time the left hand may pull in the opposite direction.

I do not abandon or dedicate to the public any patentable features set forth herein and not hereinafter claimed, but reserve the right to claim the same either in a reissue of any patent that may be granted upon this application or in other applications for Letters Patent that I may make.

Having thus described my invention, I claim as new and desire to secure by Letters Patent—

In a treadle-power, the combination, with the shaft $d$, carrying the cranks $c$, of the treadles $a$, connected at one end to the arms $g$, connected to oppositely-projecting cranks $c'$, the opposite ends of said treadles $a$ being pivoted upon a shaft, $b$, and the bail-shaped rails $h$, with both their lower ends fastened to the treadles, substantially as and for the purpose set forth.

GEORGE A. GREENE.

Witnesses:
ALFRED H. SMITH,
W. H. THARPE.